United States Patent
Udagawa et al.

[19]

[11] Patent Number: 5,979,907
[45] Date of Patent: Nov. 9, 1999

[54] METAL GASKET WITH EDGE SUPPORT SHIM

[75] Inventors: Tsunekazu Udagawa, Ichikawa; Tatsuro Uchida, Tokyo, both of Japan

[73] Assignee: Ishikawa Gasket Co., Ltd., Tokyo, Japan

[21] Appl. No.: 09/000,834

[22] Filed: Dec. 30, 1997

[51] Int. Cl.$^6$ ..................................................... F16J 15/08
[52] U.S. Cl. ............................................................ 277/593
[58] Field of Search ................................... 277/591, 593, 277/598, FOR 248

[56] References Cited

U.S. PATENT DOCUMENTS

| | | |
|---|---|---|
| 1,928,585 | 9/1933 | Balfe . |
| 3,655,210 | 4/1972 | Farnam et al. . |
| 4,088,347 | 5/1978 | Bruggemann et al. . |
| 4,955,621 | 9/1990 | Skrycki . |
| 5,054,793 | 10/1991 | Havenstein et al. . |
| 5,193,822 | 3/1993 | Bonell et al. . |
| 5,364,109 | 11/1994 | Sihon . |
| 5,427,389 | 6/1995 | Ishikawa et al. . |
| 5,439,234 | 8/1995 | Udagawa . |
| 5,538,263 | 7/1996 | Udagawa . |

FOREIGN PATENT DOCUMENTS

| | | |
|---|---|---|
| 0483013 | 4/1992 | European Pat. Off. . |
| 62-177363 | 8/1987 | Japan . |

*Primary Examiner*—Anthony Knight
*Assistant Examiner*—John L. Beres
*Attorney, Agent, or Firm*—Kanesaka & Takeuchi

[57] ABSTRACT

A metal cylinder head gasket of the invention is basically formed of a metal plate extending substantially throughout an entire area of an engine to be sealed, and a plurality of cylinder bores and bolt holes. The cylinder bores are arranged in a longitudinal direction of the metal plate, and the bolt holes are situated around the respective cylinder bores. At least one shim is located at at least one of four corner areas of the metal plate without extending outwardly from the corner area where the shim is located. The shim supports a tightening pressure of bolts to thereby prevent deformation of the cylinder head. Sealing means for the cylinder bores and other holes can be equally compressed to help sealing of the cylinder bores and other holes.

5 Claims, 1 Drawing Sheet

METAL GASKET WITH EDGE SUPPORT SHIM

BACKGROUND OF THE INVENTION AND RELATED ART STATEMENT

The present invention relates to a metal cylinder head gasket for an internal combustion engine, which is provided with an edge support shim to prevent deformation of a cylinder head.

An engine and a gasket installed therein for an automobile include cylinder bores, water holes, oil holes, bolt holes and so on. Since high pressure and temperature are formed in the cylinder bores when the engine is actuated, bolts for securing the engine parts together with the gasket are generally arranged around the cylinder bores to securely seal therearound. Other holes, such as water holes and oil holes, are situated near the cylinder bores, and are sealed by the tightening pressure of the bolts for sealing the cylinder bores.

Therefore, the other holes, i.e. water holes and oil holes, do not generally receive equal tightening pressure from the bolts. As a result, although the other holes have sealing means in the gasket, various sealing problems occur in these other holes.

On the other hand, in an engine where the cylinder bores are arranged linearly, since the sealing means are formed around the cylinder bores of the gasket, when the engine is assembled, the center area of the cylinder head is liable to bend upwardly while the longitudinal end areas are compressed close to the cylinder block. This causes an unbalanced tightening pressure to the sealing means for the cylinder bores and other holes, which may cause leakage of a fluid from the engine. Also, high tightening pressures are concentrated at the longitudinal end areas of the gasket.

In order to solve the problems, various attempts have been made. For example, in U.S. Pat. No. 5,427,389, beads are formed at longitudinal end portions of the gasket to support high tightening pressures applied thereto. Also, in U.S. Pat. No. 5,538,263, shims are located at the longitudinal end portions of the gasket to support the high tightening pressures. Further, in U.S. Pat. No. 5,439,234, beads around the cylinder bores located at the longitudinal end portions are doubled to support the strong tightening pressures applied thereto.

The support beads and the shims support the high tightening pressures applied to the longitudinal end areas of the engine to improve the unbalanced tightening pressures. However, since the tightening pressures applied to the longitudinal end portions may not be equal even in the longitudinal end portions, it is desirous to improve the supporting system for the tightening pressures at the longitudinal end portions.

The present invention has been made in view of the conventional gaskets, and an object of the invention is to provide a metal cylinder head gasket for an internal combustion engine, which can properly support the tightening pressures applied to the longitudinal end portions of the engine Another object of the invention is to provide a metal cylinder head gasket as stated above, which allows sealing means for the cylinder bores and other holes to securely seal therearound.

A further object of the invention is to provide a metal cylinder head gasket as stated above, wherein the tightening pressures applied to the longitudinal end portions can be adjusted as desired.

Further objects and advantages of the invention will be apparent from the following description of the invention.

SUMMARY OF THE INVENTION

A metal cylinder head gasket of the invention is basically formed of a metal plate extending substantially throughout an entire area of an engine to be installed, and a plurality of cylinder bores and bolt holes situated in the metal plate. The cylinder bores are arranged in a longitudinal direction of the metal plate, and the bolt holes are arranged around the respective cylinder bores.

The metal plate has two longitudinal edges extending substantially along the longitudinal direction of the metal plate, two side edges extending substantially perpendicularly to the longitudinal direction of the metal plate, and four corner areas located at portions where the longitudinal edges and the side edges intersect together.

In the gasket of the invention, at least one shim is located at at least one of the four corner areas of the metal plate without extending outwardly therefrom. The shim supports a tightening pressure by bolts at the corner area to thereby prevent deformation of the cylinder head.

In the invention, the shim is located only at the corner area of the metal plate, where high tightening pressure is formed. Namely, the shim is not formed continuously at the longitudinal end area where two corner areas are situated adjacent to each other. Since the shim is located only at the required corner area, the tightening pressure can be precisely adjusted as required.

The gasket is especially useful for the engine where the cylinder bores are not symmetrically arranged relative to the entire gasket area. In this engine, since the tightening pressures applied to the corner areas are not equal, the gasket of the invention can properly adjust the tightening pressure at the corner area. Accordingly, sealing means around the cylinder bores and other holes can be compressed substantially equally to securely seal therearound.

The shim includes a first side with a first edge disposed on one of the longitudinal edges, and a second side with a second edge disposed on one of the side edges. The first and second sides are integrally connected together at a corner thereof.

Each corner area is defined by a first line passing through a center of a cylinder bore located at the longitudinal end of the metal plate, and by a second line passing through the center of the cylinder bore where the first line passes. The first line extends along the longitudinal direction of the metal plate, and the second line extends perpendicularly to the first line.

The shim may be formed of only the first and second sides without surrounding a bolt hole situated in the corner area. On the other hand, the shim may include a curved portion surrounding a bolt hole situated in the corner area in addition to the first and second sides.

The shim may be located at only one of the four corner areas, or may be located at two, three or all four corner areas. When two shims are located at two corner areas of the metal plate situated adjacent to each other, the two shims have sizes different from each other to support different tightening pressures applied thereto.

In the invention, the gasket is formed of one metal plate. However, one or more metal plates may be laminated on the base metal plate to form a metal laminate gasket.

DETAILED DESCRIPTION OF PREFERRED EMBODIMENTS

Figure 1:
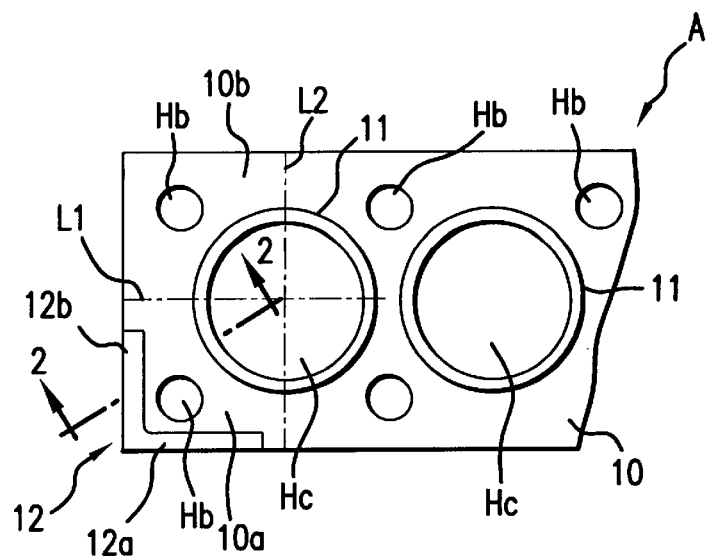
FIG. 1 is a partial plan view of a first embodiment of a metal gasket of the invention.
Figure 2:
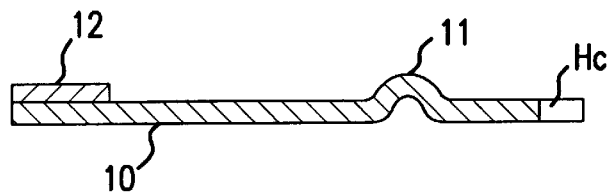
FIG. 2 is an enlarged cross sectional view taken along line 2—2 in FIG. 1.

With reference to FIGS. 1 and 2, a first embodiment A of a metal gasket of the invention is explained.

The gasket A is a cylinder head gasket formed of one metal plate 10 extending throughout an entire area of an engine to be sealed. The gasket A includes a plurality of cylinder bores Hc arranged in the longitudinal direction of the gasket, water holes (not shown), oil holes (not shown), bolt holes Hb, and so on, as in the conventional gasket. Beads 11 are formed around the cylinder bores Hc.

In the gasket A, corner areas 10a, 10b are defined on the metal plate 10 by first and second lines L1, L2 extending through a center of a cylinder bore located at each longitudinal end of the gasket. The first line L1 extends along the longitudinal direction of the gasket, and the second line L2 extends perpendicularly to the first line L1. Totally, four corner areas 10a, 10b are formed in the gasket A.

In the gasket A, a shim 12 is located on the corner area 10a of the metal plate 10 and fixed thereto by a spot welding. The shim 12 includes a first side 12a and a second side 12b, and are integrally united at a corner thereof. The edges of the first and second sides 12a, 12b are aligned with the edges of the metal plate 10 or gasket.

The thickness and the sizes of the shim 12 are determined by the tightening pressure applied thereto and the size of the corner area 10a. However, the first and second sides 12a, 12b are located in the corner area 10a without extending beyond the first and second lines L1, L2. Also, the shim 12 is located outside the bolt hole Hb.

When the gasket A is situated between a cylinder head and a cylinder block (both not shown) and is tightened, high tightening pressures are applied to the longitudinal end portions, i.e. corner areas 10a, 10b, to force to bend the middle portion of the cylinder head upwardly. Especially, a high tightening pressure is applied to the corner area 10a. However, since the shim 12 is located at the corner area 10a, the shim 12 supports the tightening pressure applied thereto. Therefore, the bending of the cylinder head is reduced or substantially prevented.

Especially, the shim 12 is useful when the tightening pressure on the metal plate 10 is unbalanced between the corner areas 10a, 10b. The unbalanced tightening pressure can be compensated by the shim 12. As a result, the tightening pressures by the bolts can be substantially equally applied to all the sealing means around the cylinder bores and other holes, so that the cylinder bores and other holes can be securely sealed by the sealing means.

Figure 3:
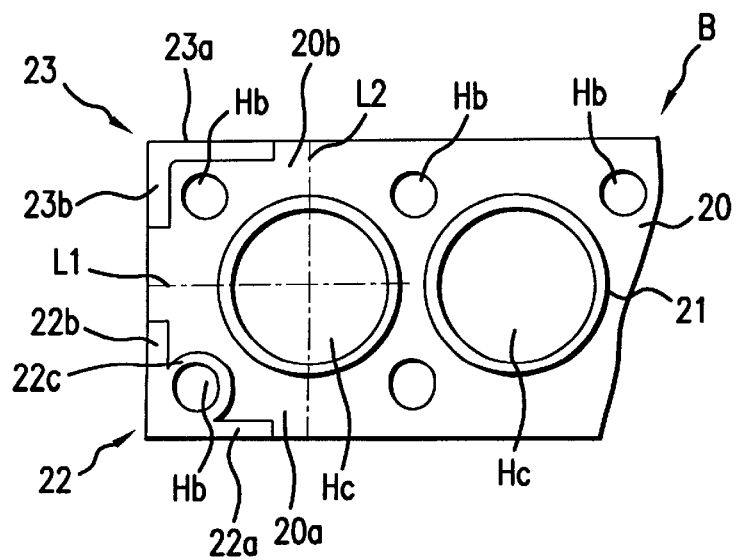
FIG. 3 is a partial plan view of a second embodiment of a metal gasket of the invention.

FIG. 3 shows a second embodiment B of a metal gasket of the invention. The gasket B is formed of a metal plate 20, and includes a plurality of cylinder bores Hc, water holes (not shown), oil holes (not shown), and bolt holes Hb, as in the gasket A. Beads 21 are formed on the metal plate 20 around the cylinder bores Hc to seal therearound.

In the gasket B, the plate 20 has corner areas 20a, 20b defined by lines L1, L2 passing through the center of the cylinder bore Hc. A shim 22 is located in the corner area 20a, and a shim 23 is located in the corner area 20b, both supporting the tightening pressures applied to the corner areas 20a, 20b.

The shim 22 includes first and second sides 22a, 22b, and a curved portion 22c surrounding a bolt hole Hb. Since the shim 22 has the curved portion 22c, to which tightening pressure of the bolt is directly applied, the tightening pressure applied to the shim 22 is huge, but in regard to the supporting of the bending force of the cylinder head, it is not so strong, as compared to the gasket A.

The shim 23 has first and seconds sides 23a, 23b, as in the shim 12. The width of the second side 23b is greater than that of the first side 23a to support a large force thereat.

The shims 22, 23 have the same thicknesses, but the thicknesses may be different based on the balance of the tightening pressure applied thereto.

In the gasket B, since the tightening pressures applied to the corner areas 20a, 20b are different, i.e. the corner area 20a receives the tightening pressure greater than that on the corner area 20b, the sizes of the shim 22, 23 are made different. Thus, in one gasket, different shims may be attached to the gasket to properly support the tightening pressures applied to the corner areas of the gasket.

In the above embodiments, the gasket is formed of one metal plate, but one or more metal plates may be laminated to form a metal laminate gasket.

In the invention, the tightening pressures applied to the corner areas of the gasket can be precisely controlled, so that the sealing for the cylinder bores and other holes can be equally made.

While the invention has been explained with reference to the specific embodiments of the invention, the explanation is illustrative, and the invention is limited only by the appended claims.

What is claimed is:

1. A metal cylinder head gasket for an internal combustion engine, comprising:

a metal plate extending substantially throughout an entire area of the engine to be sealed, said metal plate having two longitudinal edges extending substantially along a longitudinal direction of the metal plate, two side edges extending substantially perpendicularly to the longitudinal direction of the metal plate, and four corner areas located at portions where the longitudinal edges and the side edges intersect together, a plurality of cylinder bores situated in the metal plate and arranged in the longitudinal direction of the metal plate, each of said corner areas being defined by a first line passing through a center of one of two cylinder bores located at longitudinal ends of the metal plate, said first line extending along the longitudinal direction of the metal plate, and by a second line passing through the center of the cylinder bore where the first line passes, said second line extending perpendicularly to the first line, a plurality of bolt holes situated in the metal plate and arranged around the respective cylinder bores, and at least one shim located at at least one of the four corner areas of the metal plate, without extending outwardly from the corner area where the shim is located, adapted to support a tightening pressure of bolts to thereby prevent deformation of a cylinder head, said at least one shim including a first side with a first edge disposed on one of the longitudinal edges, and a second side with a second edge disposed on one of the side edges, said first and second sides being integrally connected together at a corner thereof, said second side being disposed away from the first line.

2. A metal cylinder head gasket according to claim 1, wherein said shim is formed of only the first and second sides without surrounding a bolt hole situated in the corner area.

3. A metal cylinder head gasket according to claim 1, wherein said shim further includes a curved portion surrounding a bolt hole situated near the corner.

4. A metal cylinder head gasket according to claim 1, wherein said first side is located away from the second line.

5. A metal cylinder head gasket for an internal combustion engine, comprising:

a metal plate extending substantially throughout an entire area of the engine to be sealed, said metal plate having two longitudinal edges extending substantially along a longitudinal direction of the metal plate, two side edges extending substantially perpendicularly to the longitudinal direction of the metal plate, and four corner areas located at portions where the longitudinal edges and the side edges intersect together, a plurality of cylinder bores situated in the metal plate and arranged in the longitudinal direction of the metal plate, a plurality of bolt holes situated in the metal plate and arranged around the respective cylinder bores, and at least two shims located at at least two of the four corner areas of the metal plate and situated adjacent to each other, each shim being disposed without extending outwardly from the corner area where the shim is located, adapted to support a tightening pressure of bolts to thereby prevent deformation of a cylinder head, each shim including a first side with a first edge disposed on one of the longitudinal edges and a second side with a second edge disposed on one of the side edges, said first and second sides being integrally connected together at a corner thereof, said at least two shims having sizes different from each other to support different tightening pressures applied thereto.

* * * * *